United States Patent
Sandberg et al.

(10) Patent No.: US 10,278,190 B2
(45) Date of Patent: Apr. 30, 2019

(54) METHOD, NETWORK NODE AND COMPUTER PROGRAM FOR DETERMINING SIGNAL TO NOISE RATIO, AND METHOD, NETWORK NODE AND COMPUTER PROGRAM FOR CONTROLLING TRANSMISSION OF DELAY SENSITIVE DATA IN A COMMUNICATION NETWORK

(71) Applicant: TELEFONAKTIEBOLAGET LM ERICSSON (PUBL), Stockholm (SE)

(72) Inventors: David Sandberg, Solna (SE); Björn Nordström, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/529,741

(22) PCT Filed: Feb. 24, 2015

(86) PCT No.: PCT/EP2015/053806
§ 371 (c)(1),
(2) Date: May 25, 2017

(87) PCT Pub. No.: WO2016/134748
PCT Pub. Date: Sep. 1, 2016

(65) Prior Publication Data
US 2017/0311334 A1    Oct. 26, 2017

(51) Int. Cl.
*H04L 1/00*    (2006.01)
*H04L 1/08*    (2006.01)
(Continued)

(52) U.S. Cl.
CPC ........ *H04W 72/082* (2013.01); *H04B 17/318* (2015.01); *H04B 17/336* (2015.01);
(Continued)

(58) Field of Classification Search
CPC .... H04B 17/318; H04B 17/336; H04L 72/082
See application file for complete search history.

(56) References Cited

U.S. PATENT DOCUMENTS 5,874,916 A * 2/1999 Desiardins .............. G01S 1/045
342/378
6,804,640 B1  10/2004 Weintraub et al.
(Continued)

FOREIGN PATENT DOCUMENTS

WO    2013/112078 A1    8/2013

OTHER PUBLICATIONS

International Search Report, and Written Opinion, dated Oct. 29, 2015, from corresponding PCT Application No. PCT/EP2015/053806.
(Continued)

*Primary Examiner* — Kevin C. Harper
(74) *Attorney, Agent, or Firm* — Patent Portfolio Builders PLLC

(57) ABSTRACT

Disclosed is a network node and a method performed by a network node in a wireless communication network for determining signal to noise ratio of a signal received at a receiver from a first mobile station, which signal may include both noise and interference. The method comprises obtaining a plurality of measured noise and interference power values, IN values, of signals received at the receiver in one or more frequency sub-bands, determining IN for a lowest X percentile of the measured IN values, and applying the determined IN for the lowest X percentile as a measure of the noise. The method further comprises obtaining a measured signal strength value for a signal received at the receiver from the first mobile station, and determining SNR for the signal from the first mobile station by applying the determined noise measure.

20 Claims, 7 Drawing Sheets

(51) Int. Cl.
*H04L 1/20* (2006.01)
*H04W 72/04* (2009.01)
*H04W 72/08* (2009.01)
*H04B 17/318* (2015.01)
*H04B 17/336* (2015.01)

(52) U.S. Cl.
CPC .............. *H04L 1/0007* (2013.01); *H04L 1/08* (2013.01); *H04L 1/20* (2013.01); *H04W 72/0446* (2013.01)

(56) References Cited

U.S. PATENT DOCUMENTS

2010/0226269 A1   9/2010   Chakraborty et al.
2016/0286435 A1*  9/2016   Zhang ..................... H04W 4/50

OTHER PUBLICATIONS

Fei Chen et al., "Incremental Quantile Estimation for Massive Tracking", Proceedings of the Sixth ACM SIGKDD International Conference on Knowledge Discovery and Data Mining, Jan. 1, 2000, pp. 516-522.
Raj Jain et al., "The P2 Algorithm for Dynamic Calculation of Quantiles and Histograms Without Storing Observations", Communications of the ACM, Oct. 1985, pp. 1076-1085, vol. 28, No. 10.
Lap-Cheung Lau et al., "A Fast and Low-Storage Algorithm for Finding Quantiles", Department of Statistics, North Carolina State University; Institute of Statistics Mimeo Series No. 2268, Sep. 1, 1994, retrieved from the Internet: URL:http://www.stat.ncsu.edu/information/library/mimeo.archive/ISMS_1994_2268.pdf.

* cited by examiner

METHOD, NETWORK NODE AND COMPUTER PROGRAM FOR DETERMINING SIGNAL TO NOISE RATIO, AND METHOD, NETWORK NODE AND COMPUTER PROGRAM FOR CONTROLLING TRANSMISSION OF DELAY SENSITIVE DATA IN A COMMUNICATION NETWORK

TECHNICAL FIELD

The present disclosure relates to a method performed by a network node in a wireless communication network for determining signal to noise ratio of a signal received from a first UE, which signal may include both noise and interference. The present disclosure further relates to a method performed by a network node of a packet data communication network, for controlling transmission of delay-sensitive data from a first UE to the network node, which first UE is capable of changing between a TTI bundling enabled mode and a TTI bundling disabled mode. The present disclosure also relates to network nodes, computer programs and carriers corresponding to the above mentioned methods.

BACKGROUND

Wireless communication is constantly increasing in the world today. Efficient usage of communication resources is a hot topic in any type of wireless communication network, such as different 3GPP defined access technology networks, e.g. Global System for Mobile Communication, GSM, High Speed Packet Access, HSPA and Long Term Evolution, LTE. For achieving efficient communication in such wireless communication networks, a good estimation of signal to noise ratio, SNR, over individual wireless connections is of interest. For example, with a good estimation of SNR, traffic resources of a base station can be allocated to different mobile stations connected to the base station so that the traffic resources of the base station are efficiently used.

One area where it is important to allocate traffic resources efficiently between mobile stations and a base station is when using a service called Transmission Time Interval, TTI, bundling for transmitting Voice over IP, VoIP, packets in LTE between a User Equipment, UE (the mobile station of LTE is called UE) and an eNodeB (the name of the base station in LTE). TTI bundling was standardized in 3GPP to provide more efficient uplink transmission of delay sensitive packets. With TTI bundling enabled the UE transmits the same VoIP packet in 4 consecutive TTIs, thereby reducing the delay, since no Hybrid Automatic Repeat Request, HARQ, feedback is required between the transmissions, and the header overhead, since no RLC segmentation is needed. On the other hand, when the pathloss is small and a VoIP packet can be transmitted within one TTI, the extra transmissions from TTI bundling is only waste. It is therefore needed to only enable TTI bundling for a user when it is needed. One effective method for this is described in WO2013112078 in which the Signal to Noise Ratio is measure for a UE and the UE is switched to TTI bundling when the SNR becomes too poor.

However, in WO2013112078 there is no difference made between disturbances from noise and disturbances from interference. Consequently, what is actually measured in WO2013113078 is Signal to Interference and Noise Ratio, SINR. TTI bundling is a good way to reduce latency when the pathloss is high, i.e. when the signal has degraded so that the difference between signal strength and ambient noise, SNR, is low. On the other hand, TTI bundling is not suitable for use when the interference is high, where interference signifies disturbances from signal sent from other nearby lying communication sources, like other UEs, other eNodeBs etc. The reason is that when the UE is not power limited, which is the case when the interference is high but the pathloss is low to moderate, larger packets can be scheduled by simply using more Physical Resource Blocks, PRBs, in a single TTI, which is much more efficient than using TTI bundling. But when TTI bundling is enabled, the number of PRBs is limited to 3, and therefore the throughput becomes severely limited also in a relatively unloaded cell with many unused PRBs. Also, a switching algorithm based on SINR can become unstable. If UEs are switched to TTI bundling due to high interference, the additional transmissions will further increase the interference level. This may, in turn, cause UEs in other cells to trigger TTI bundling. Consequently, there is a need for a better way to detect SNR for use in deciding whether to use TTI bundling or not for a UE in a wireless communication system.

SUMMARY

It is an object of the invention to address at least some of the problems and issues outlined above. It is an object to achieve a better way to detect SNR in wireless communication networks in relation to prior art. It is another object to achieve a better selection process for deciding when to use TTI bundling or not to use TTI bundling for a UE. It is possible to achieve these objects and others by using a method and an apparatus as defined in the attached independent claims.

According to one aspect, a method is provided performed by a network node in a wireless communication network, for determining signal to noise ratio of a signal received at a receiver from a first mobile station, which signal may include both noise and interference. The method comprises obtaining a plurality of measured noise and interference power values, IN values, of signals received at the receiver in one or more frequency sub-bands, determining IN for a lowest X percentile of the measured IN values and applying the determined IN for the lowest X percentile as a measure of the noise. The method further comprises obtaining a measured signal strength value for a signal received at the receiver from the first mobile station, and determining SNR for the signal from the first mobile station by applying the determined noise measure.

According to another aspect, a method is provided performed by a network node of a packet data communication network, for controlling wireless transmission of delay-sensitive data from a first UE, which first UE is capable of changing between a TTI bundling enabled mode and a TTI bundling disabled mode. The method comprises obtaining a plurality of measured noise and interference power values, IN values, of signals received at a receiver in one or more frequency sub-bands, determining IN for a lowest X percentile of the measured IN values and applying the determined IN for the lowest X percentile as a measure of the noise. The method further comprises obtaining a measured signal strength value for a signal received at the receiver from the first UE, and determining SNR for the signal from the first UE by applying the determined noise measure. The method further comprises deciding that the first UE is to be in TTI bundling enabled mode when the determined SNR is below a first threshold value, and deciding that the first UE is to be in TTI bundling disabled mode when the determined SNR is above a second threshold value.

According to another aspect, a network node is provided operable in a wireless communication network, configured for determining signal to noise ratio of a signal received at a receiver from a first mobile station, which signal may include both noise and interference. The network node comprises a processor and a memory, said memory containing instructions executable by said processor, whereby the network node is operative for obtaining a plurality of measured noise and interference power values, IN values, of signals received at a receiver in one or more frequency sub-bands, determining IN for a lowest X percentile of the measured IN values, and applying the determined IN for the lowest X percentile as a measure of the noise. The memory further contains instructions executable by said processor, whereby the network node is operative for obtaining a measured signal strength value for a signal received at the receiver from the first mobile station, and determining SNR for the signal by applying the determined noise measure.

According to another aspect, a network node is provided operable in a packet data communication network, configured for controlling wireless transmission of delay-sensitive data from a first UE, which first UE is capable of changing between a TTI bundling enabled mode and a TTI bundling disabled mode. The network node comprises a processor and a memory, said memory containing instructions executable by said processor, whereby the network node is operative for obtaining a plurality of measured noise and interference power values, IN values, of signals received at a receiver in one or more frequency sub-bands, determining IN for a lowest X percentile of the measured IN values, and applying the determined IN for the lowest X percentile as a measure of the noise. The memory further contains instructions executable by said processor, whereby the network node is operative for obtaining a measured signal strength value for a signal received at the receiver from the first UE, and determining SNR for the signal from the first UE by applying the determined noise measure. The memory further contains instructions executable by said processor, whereby the network node is operative for deciding that the first UE is to be in TTI bundling enabled mode when the determined SNR is below a first threshold value, and deciding that the first UE is to be in TTI bundling disabled mode when the determined SNR is above a second threshold value.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to achieve a good estimation of signal to noise ratio for signals received at a receiver of a base station of a wireless communication system. This is achieved by measuring noise and interference, IN, values for a plurality of signals received at the receiver, determining IN for a lowest X percentile of the measured IN values and applying the determined IN for the lowest X percentile as a measure of the noise. When the noise has been determined in this way, SNR may be determined for a signal received from a first UE by measuring signal strength for the signal received from the first UE, and determining SNR for the signal by applying the determined noise measure. In a similar way, a solution is provided for controlling transmission of delay-sensitive data from a first UE to a base station of a wireless communication network, which first UE is capable of changing between a TTI bundling enabled mode and a TTI bundling disabled mode. This is achieved by performing a determination of the SNR for a first UE in a similar way as described above, and then use this determination to determine whether the first UE is to be in TTI bundling enabled mode or in TTI bundling disabled mode. The determination whether the first UE is to be in TTI bundling enabled mode or in TTI bundling disabled mode is made by comparing the determined SNR to a defined SNR threshold and enable TTI bundling if the determined SNR is below the SNR threshold and disable TTI bundling if the determined SNR is above the SNR threshold.

Figure 1:
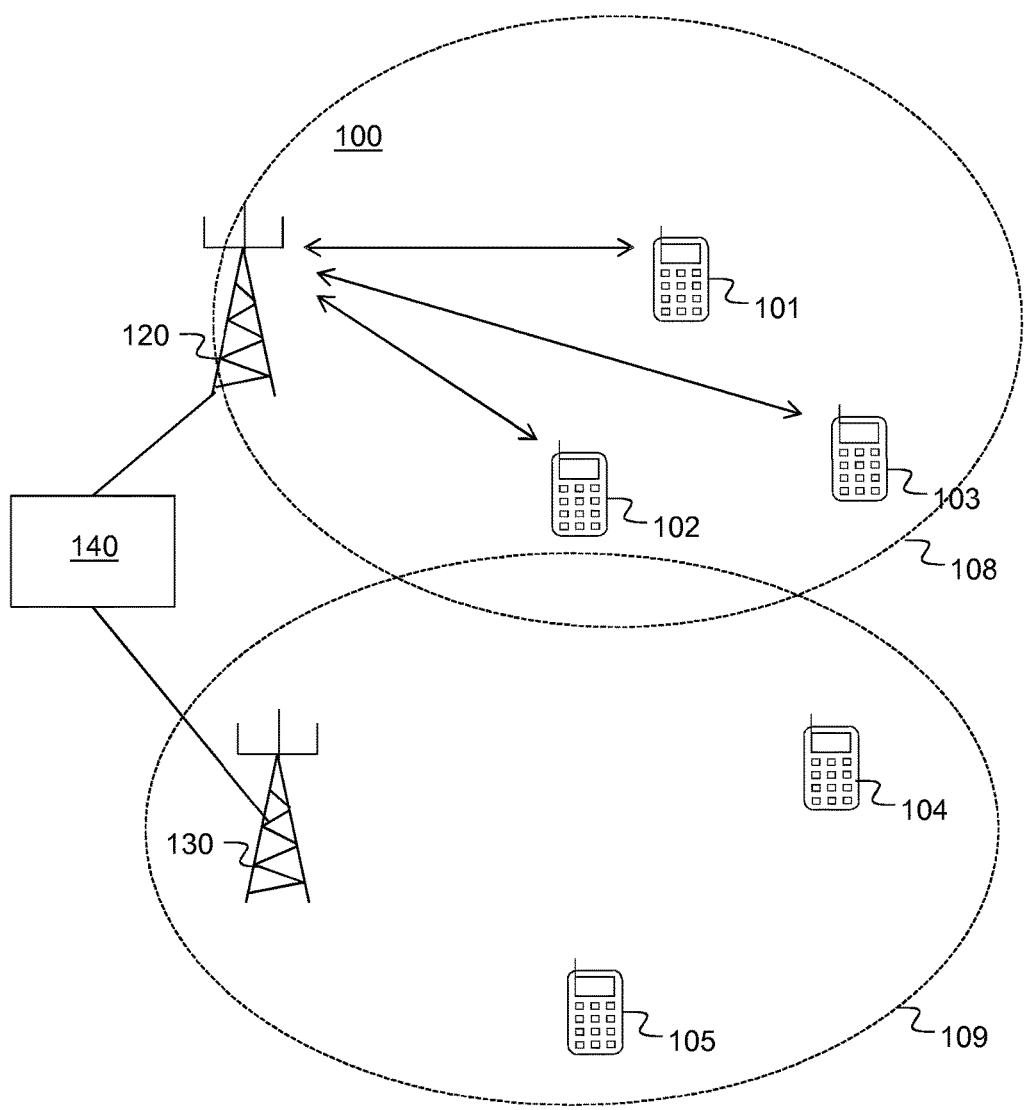
FIG. 1 is an overview of a wireless communication network in which the present invention may be used.

FIG. 1 shows a wireless communication network 100 having a cellular structure comprising a first cell 108 and a second cell 109. A first base station 120 provides coverage in the first cell 108, which means that mobile stations 101, 102, 103 residing within the first cell 108 can communicate in the communication network 100 by sending and receiving wireless signals to/from the first base station 120. In a similar way, mobile stations 104, 105 residing in the second cell 109 communicates in the communication network 100 by sending and receiving wireless signals to/from the second base station 130. The first base station 120 has one or more receivers having one or more antennas for receiving signals from the mobile stations 101, 102, 103 residing in the first cell 108. However, the receiver may also receive ambient noise at its antenna as well as signals originating from mobile stations residing in neighboring cells, such as signals originating from the mobile stations 104, 105 residing in the second cell 109. The signals originating from the mobile stations 104, 105 are called interference signals since they are not directed towards the first base station but towards the second base station, and therefore give rise to disturbances at the receiver of the first base station. The wireless network of FIG. 1 further comprises radio access network nodes and core network nodes exemplified by a controller node 140. The controller node may be a radio network controller. The wireless communication network of FIG. 1 may be an LTE-based network in which the first and the second base stations 120, 130 are called eNodeBs, the mobile stations 101-105 are called UEs and the radio network controller is called mobility management entity, MME. In LTE it may also be possible for the eNodeBs to communicate directly with each other.

Figure 2:
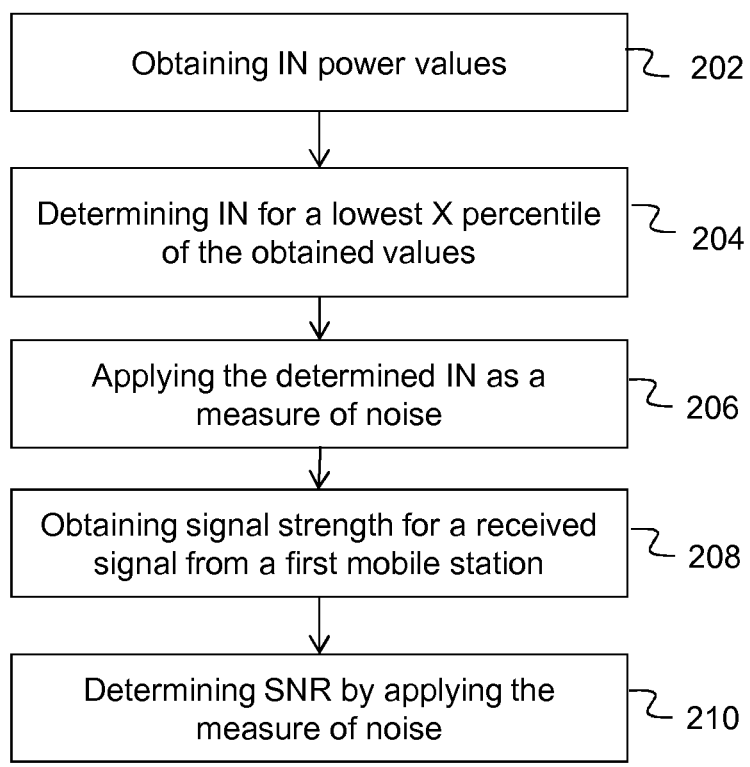
FIG. 2 is a flow chart illustrating a method in a network node, according to possible embodiments.

FIG. 2 describes a method that may be performed for a network such as the network described in FIG. 1. In FIG. 2, a method is described performed by a network node 120 in a wireless communication network 100 for determining signal to noise ratio of a signal received at a receiver from a first mobile station 101, which signal may include both noise and interference. The method comprises obtaining 202 a plurality of measured noise and interference power values, IN values, of signals received at a receiver in one or more frequency sub-bands, determining 204 IN for a lowest X percentile of the measured IN values, applying 206 the determined IN for the lowest X percentile as a measure of the noise, obtaining 208 a measured signal strength value for a signal received at the receiver from the first mobile station, and determining 210 SNR for the signal from the first mobile station by applying the determined noise measure.

A sub-band is a frequency interval which is a part of a larger frequency interval over which the network node communicates. The sub-band comprises a plurality of physical resource blocks, PRBs. A signal on which the IN values are measured is received at the receiver in one or more PRBs of a sub-band. The signal may comprise e.g. only noise, noise and interference, noise and useful information directed to the receiver, or noise, interference and useful information. Interference is a signal received at the receiver from mobile stations that are connected to other network nodes that resides in the neighborhood of the first base station. Useful information is a signal that is sent from a mobile station that is connected to the first base station, which signal is directed to the first base station. A suitable value for the "X" in "X percentile" may vary depending on application. For example, if 5 is selected, the value for a signal at the 5 lowest percentile (0.05) of the SINR is selected as a measure of the noise. In some applications the value need to be lower than that and in some applications the value may be higher, an upper percentile limit may be 50%, but a percentile of 3-20 may be more usual. In the measuring of IN values, the network node may measure IN in a frequency sub-band where there is a signal from a UE connected to the first base station, which signal is destined to the first base station. Such a signal then comprises both signal power and noise and interference power. In such a case the signal power is subtracted from the measured power so that only noise and interference power remains. In other cases there is no signal received in the PRB, only noise and interference, then the measured value is the same as the IN value. The receiver is a receiver of a base station to which the first UE communicates, i.e. the first base station 120.

The network node may be the base station with which the first UE communicates, such as the first base station 120 of FIG. 1. In that case the receiver is the receiver of the network node. Also, when the network node is the first base station, the network node performs the measurement of IN power values of signals received at its receiver, as well as the measurement of signal strength on the signal received from the first mobile station. In an alternative, the network node may be another network node of the communication network, such as the controller node 140, or the steps of the method may be performed by a cloud computer solution in which functionality for performing the method is spread out over different nodes in the communication network. In that case the controller node or the cloud computers obtain the measurements performed by the first base station.

By selecting a good value for X in such a method, a good estimation of the noise may be achieved when noise is mixed with interference for some measures and not mixed with interference for other measures. What is a good value of X differs depending on how many measures that statistically comprises interference and how large the interference is, examples of values of X are given in the description. By the method described, a better noise estimation is achieved compared to prior art.

According to an embodiment, the IN for the lowest X percentile is determined 204 by estimating a probability density function, PDF, from the measured plurality of IN values and extracting, from the PDF, the IN value of the lowest X percentile. By such a method a good estimation of SNR can be achieved as long as an enough low value of X is chosen. However, for being able to use such a method and to get a good enough estimation of noise and subsequently for the SNR, a significant amount of IN values need to be obtained, which takes time and requires high storage capacity. An even better way of determining the IN for the lowest X percentile is described in the following:

According to another embodiment, the IN for the lowest X percentile is determined 204 by decreasing the IN estimate of the lowest X percentile by a first size, when a first IN value of the measured IN values is below an IN estimate of the lowest X percentile, and increasing the IN estimate of the lowest X percentile by a second size that is smaller than the first size, when a second IN value of the measured IN values is above the current IN estimate of the lowest X percentile. In this embodiment the relation between the first and the second size is related to the value of X. By such an embodiment, the IN of the lowest X percentile may be estimated well from a much lower amount of IN values than what is needed in the embodiment described in the previous paragraph the probability density function is first determined and the value is then found from the PDF.

According to a variant of the latter embodiment, the second size is determined as $(X/(1-X))*(\text{first size})$.

Advantages of using the proposed SNR estimation method are that the method is robust to measurement errors in IN, e.g. when the measured IN for a PRB occasionally falls significantly below the thermal noise, it uses continuously updated measurements, i.e. no batch processing is necessary, and the method is processing power efficient and memory efficient.

The noise estimation may be used in many different areas of technology. One such area is when selecting whether to use TTI bundling or not for a UE in an LTE-based communication network.

Figure 3:
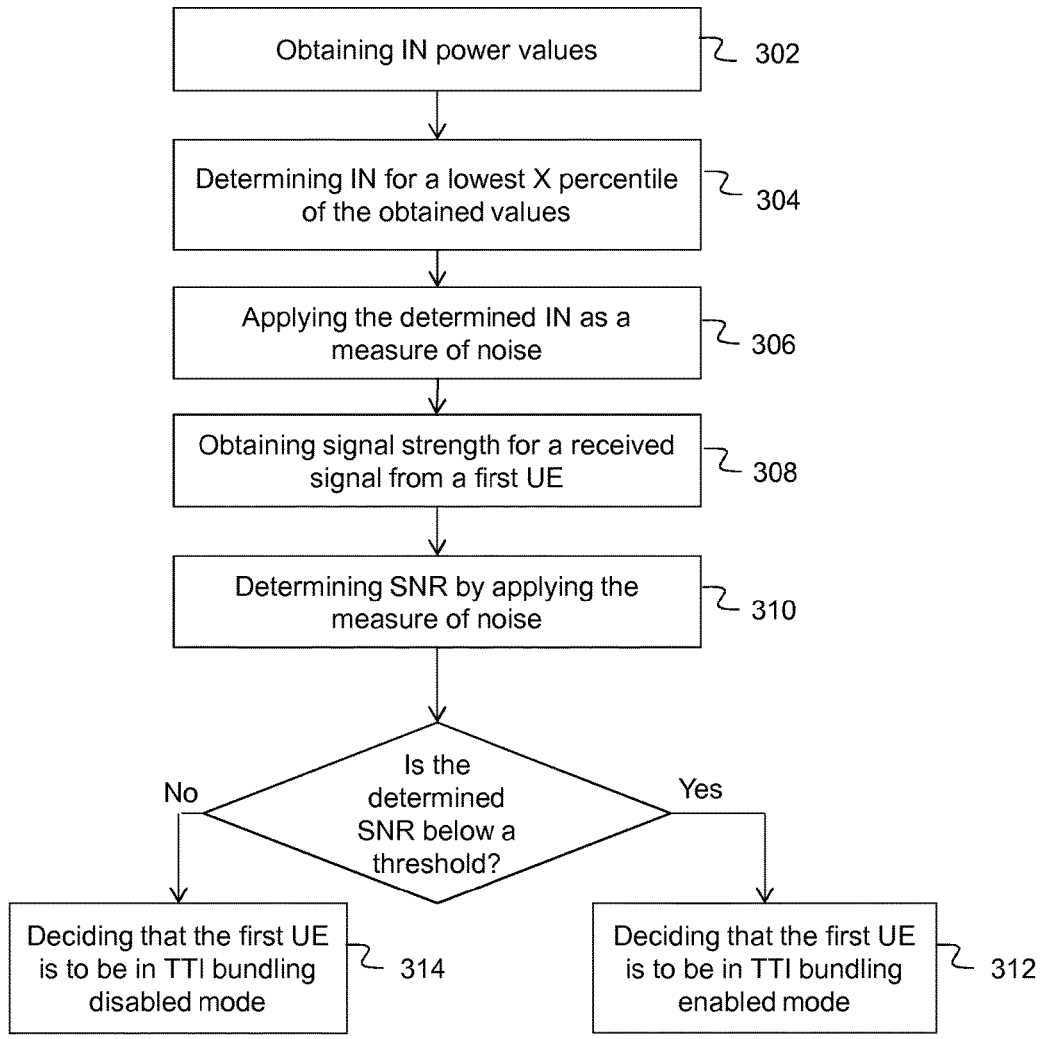
FIG. 3 is another flow chart illustrating a method in a network node, according to other possible embodiments.

FIG. 3 describes a method performed by a network node 120 of a packet data communication network, for controlling wireless transmission of delay-sensitive data from a first UE 101, which first UE is capable of changing between a TTI bundling enabled mode and a TTI bundling disabled mode. The method comprises obtaining 302 a plurality of measured noise and interference power values, IN values, of signals received at a receiver in one or more frequency sub-bands, determining 304 IN for a lowest X percentile of the measured IN values and applying 306 the determined IN for the lowest X percentile as a measure of the noise. The method further comprises obtaining 308 a measured signal strength value for a signal received at the receiver from the first UE, determining 310 SNR for the signal from the first UE by applying the determined noise measure, deciding 312 that the first UE is to be in TTI bundling enabled mode when the determined SNR is below a first threshold value, and deciding 314 that the first UE is to be in TTI bundling disabled mode when the determined SNR is above a second threshold value.

The first UE is capable of changing between a TTI bundling enabled mode where TTI bundling is used and a TTI bundling disabled mode where TTI bundling is not used for sending packets, especially delay-sensitive packets, from the first UE to the network node. The first threshold value and the second threshold value may be the same value. Alternatively, a hysteresis may be used so that the second threshold value is slightly higher than the first threshold value. By such a method it is possible to set the first UE in TTI bundling enabled mode when SNR is low, and in TTI bundling disabled mode when SNR is high, irrespective of the level of interference. As a consequence the first UE will be set in TTI bundling enabled mode when it will benefit from it and not when it is better off being served in TTI bundling disabled mode. When used for many UEs in a network the wireless communication resources are more efficiently used than by prior art methods. Other advantages of using a good estimation of SNR instead of a value influenced by interference, i.e. a Signal to Interference and noise ratio, SINR, for switching between TTI bundling enabled and disabled mode are that TTI bundling switching is not triggered by interference, that the TTI bundling switching threshold value does not have to depend on the receiver noise and that TTI bundling switching instability, i.e. where users are switched to TTI bundling due to increased interference from usage of TTI bundling in other cells, can be avoided.

According to an embodiment, the method further comprises sending an instruction to the first UE to switch to TTI bundling enabled mode, when it was decided 312 that the first UE is to be in TTI bundling enabled mode and the network node has information that the first UE is in TTI bundling disabled mode, and sending an instruction to the first UE to switch to TTI bundling disabled mode when it was decided 314 that the first UE is to be in TTI bundling disabled mode and the network node has information that first UE is in TTI bundling enabled mode.

According to an embodiment, the IN for the lowest X percentile is determined 304 by estimating a probability density function, PDF, from the measured plurality of IN values and extracting, from the PDF, the IN value of the lowest X percentile.

According to another embodiment, the IN for the lowest X percentile is determined 304 by decreasing the IN estimate of the lowest X percentile by a first size, when a first IN value of the measured IN values is below an IN estimate of the lowest X percentile, and increasing the IN estimate of the lowest X percentile by a second size that is smaller than the first size, when a second IN value of the measured IN values is above the current IN estimate of the lowest X percentile, wherein the relation between the first and the second size is related to the value of X.

According to another embodiment, the second size is equal to $(X/(1-X))*$(first size).

Advantages of using the proposed SNR estimation method are that the method is robust to measurement errors in IN, e.g. when the measured IN for a PRB occasionally falls significantly below the thermal noise, it uses continuously updated measurements, i.e. no batch processing is necessary, and the method is processing power efficient and memory efficient.

Figure 4:
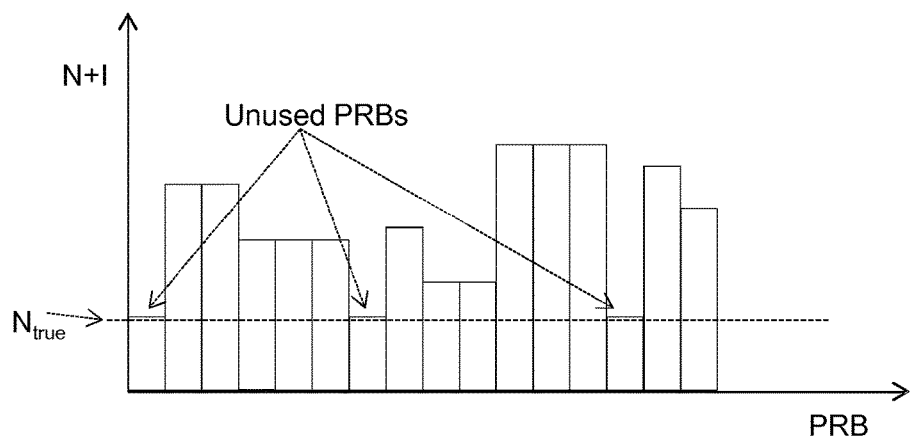
FIG. 4 is a graph illustrating exemplary values for noise and interference measured in different PRBs at a receiver.

In the following, an embodiment will be described directed to the usage of the SNR estimation method for deciding whether to set a UE in TTI bundling enabled or disabled mode. As already discussed, the interference part of SINR is excluded from the decision to switch to/from TTI bundling enabled mode is for a UE, so that the switching decision is instead made based on a pure SNR estimation. However, it is only the sum of noise and interference that can easily be measured in the receiver. In other words, there is no simple way to separate the two sources of disturbance, but as embodiments of this invention proposes, the noise can be estimated based on statistics from measurements of the noise and interference sum. FIG. 4 shows the noise plus interference, IN, samples for one TTI. The amount of interference received on a PRB depends on the number of neighbor cells where the PRB is used, the pathloss from the signals sent from interfering UEs to the receiving antennas as well as the interfering UEs' transmit powers. In FIG. 4 some PRBs are heavily used in neighboring cells resulting in high values for the corresponding IN samples. The values corresponding to PRBs that are unused in neighboring cells will have no interference and hence only thermal noise (here denoted $N_{true}$) is received on these PRBs.

Figure 5:
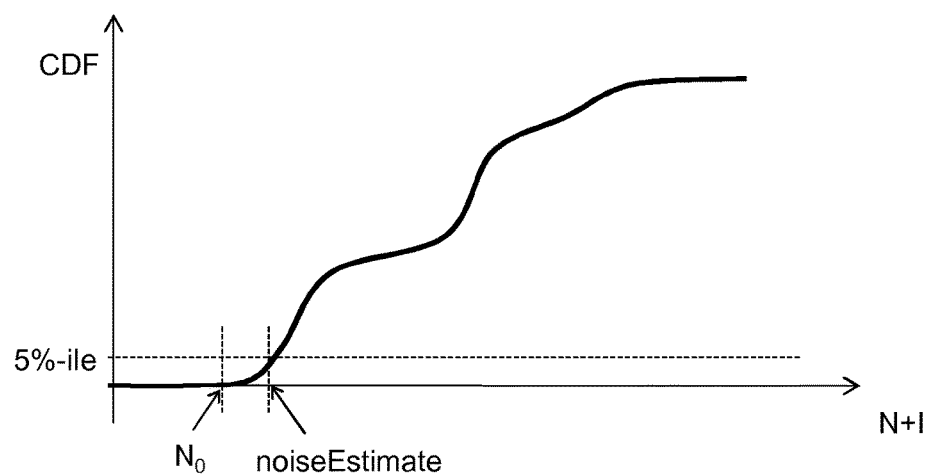
FIG. 5 is a graph illustrating a cumulative distribution function for noise and interference values measured over a time period at a receiver.

FIG. 5 shows the same IN samples as in FIG. 4 but plotted as a Cumulative Distribution Function, CDF. Also, FIG. 5 includes IN samples from a number of consecutive TTIs that have been aggregated. Since no IN samples are below the noise power level, the CDF is equal to zero to the left of the dashed denoted No. Hence, by estimating a sufficiently small percentile in this CDF it is possible to get a reasonably good estimate of the noise level can be achieved. A smaller percentile will typically yield a better estimate at the cost of longer convergence time. In the example, a noise estimate is made at the 5th percentile, i.e. at the lowest 5% of the IN samples.

Estimating a percentile in a CDF typically first requires estimation of the corresponding PDF. Even though this is a straight-forward operation, it does require a significant amount of memory for storage of the PDF values. When estimating small percentiles it is required to represent the PDF with a relatively large number of bins to get the required accuracy. A more efficient way is instead to track a certain percentile using an online estimation algorithm as is described below. A similar algorithm is today used for Outer Loop Link Adaptation to enforce a certain Block Error Rate target, but here it is applied to a totally different problem.

When an IN measurement is above or equal to the current noise estimate, the noise estimate is increased by a small step (an up-step). When an IN measurement is below the current estimate, the noise estimate is instead decreased by a larger step (a down-step). The ratio between the up-step and the down-step controls the percentile to be tracked. An additional parameter, call StepSize, which defines the size of the up-step and the down-step, i.e. not the ratio but the actual size, controls the tracking response, where a large StepSize gives the algorithm a quicker response but also a larger variation around the true value in its steady state.

Below an embodiment of the estimation algorithm is described in detail. First the up-step, here called adjustmentStepUp and the down-step, here called adjustmentStepDown, and are initialized as $$adjustmentStepUp = \frac{percentile}{1 - percentile} \cdot stepSize$$

$$adjustmentStepDown = -stepSize,$$

where percentile is the percentile to be tracked, e.g. 0.05 for the $5^{th}$ percentile and stepSize controls the responsiveness of the algorithm. The algorithm is then updated for each IN measurement, typically once for each PRB, according to the following equations $$step[i] = \begin{cases} interferenceMeasurement[i] \geq \\ noiseEstimate[i-1] \to adjustmentStepUp \\ interferenceMeasurement[i] < \\ noiseEstimate[i-1] \to adjustmentStepDown \end{cases}$$

and $$noiseEstimate[i] = noiseEstimate[i-1] + step[i],$$

where interferenceMeasurement[i] is the i:th noise plus interference measurement sample and noiseEstimate[i] is the updated noise floor estimate. In other words, if interference measurement i is greater than the current noise estimate, increase the current noise estimate with "adjustmentStepUp", if interference measurement i is lower than the current noise estimate, decrease the current noise estimate with "adjustmentStepDown".

Figure 6:
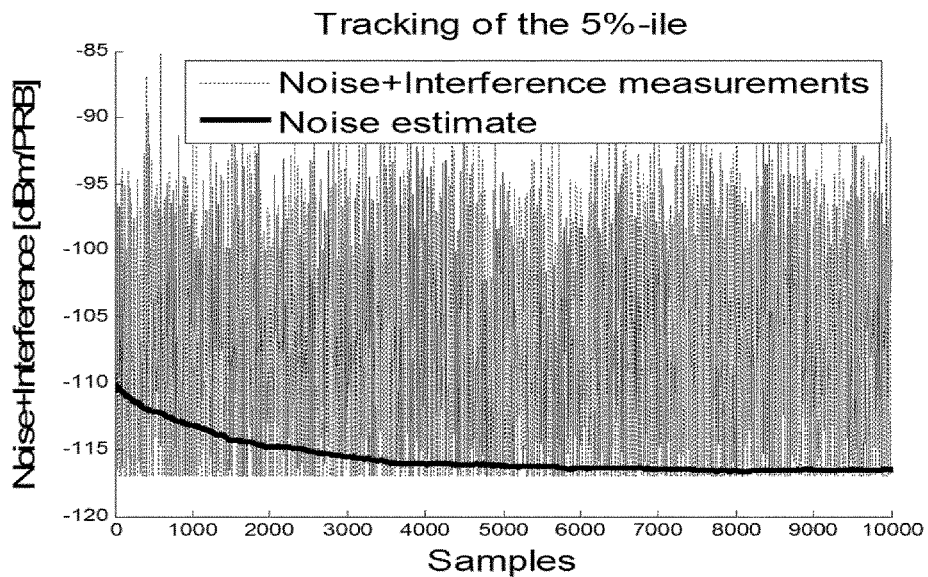
FIG. 6 is a diagram illustrating distribution of noise and interference values for a large number of samples as well as noise estimates that converges towards an estimated noise value using some of the possible embodiments of the invention.

This algorithm is used in an example shown in the graph of FIG. 6 to track the 5th percentile of the noise and interference measurements using a step size of 0.02. In this example the noise estimate for i=0, noiseEstimate[0], is initialized to −110 dBm/PRB to show the convergence of the algorithm. As seen in FIG. 6, the noise estimate for the 5th percentile converges towards −117 dB after approximately 7000 measurements. If we assume a cell with 20 MHz system bandwidth we would get measurements for 100 PRBs every millisecond. Hence 7000 measurements would correspond to 70 ms.

Figure 7:
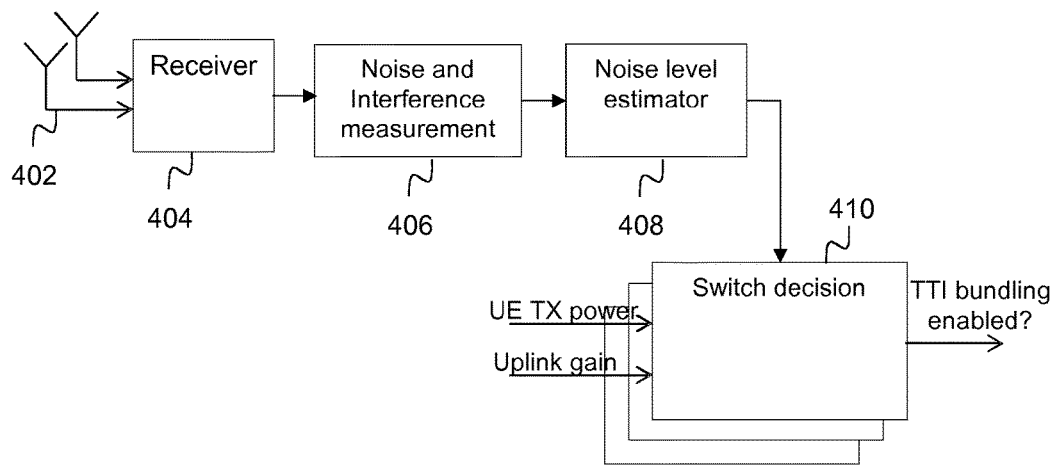
FIG. 7 is a schematic block diagram illustrating a base station according to possible embodiments.

FIG. 7 shows an embodiment of an eNodeB that is arranged for performing embodiments of the invention. The eNodeB comprises one or more antennas 402, connected to a receiver 404. The receiver is in its turn connected to a noise and interference measurement unit 406 that measures IN of signals received at the noise and interference measurement unit 406 from the antenna 402 via the receiver 404. The noise and interference measurement unit 406 sends the IN measurement values to a noise level estimator 408 that estimates the noise level based on the received IN values in accordance with at least one of the described embodiments. The noise level estimator 408 then sends its estimated noise level to a switch decision unit 410. The switch decision unit 410 further has inputs for receiving a value of the transmission power which the first UE transmitted a signal directed to the eNodeB and for receiving an uplink gain value, i.e. a determined path loss. These values are used for determining a received signal level for this signal sent from the first UE to the eNodeB. The information of signal level and of estimated noise level are then used for calculating a SNR. The calculated SNR is then used by the switch decision unit 410 to determine whether the first UE is to be in TTI bundling enabled or disabled mode. If the switch decision unit decides that the first UE is to be in TTI bundling enabled mode and it is in TTI disabled mode, or vice versa, the switch decision unit 410 initiates sending of an instruction to the first UE to switch to TTI disabled/enabled mode. The switch decision unit is illustrated as a plurality of units merely to illustrate that the switch decision unit makes decision per UE connected to the eNodeB.

Figure 8:
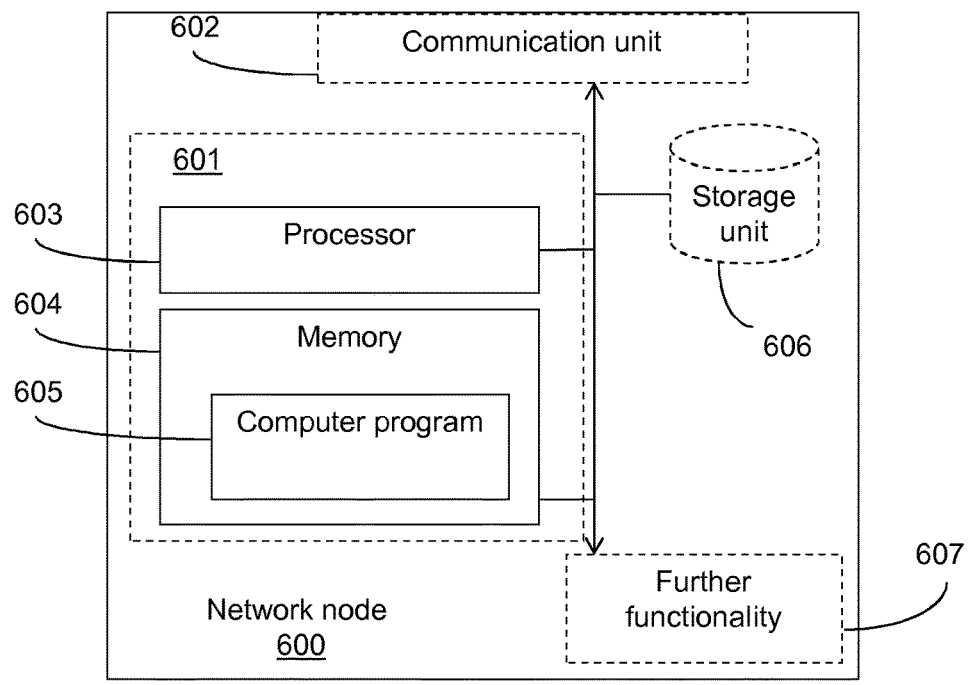
FIGS. 8-11 are schematic block diagrams illustrating network nodes according to possible embodiments.

FIG. 8 describes an embodiment of a network node 600 operable in a wireless communication network 100, configured for determining signal to noise ratio of a signal received at a receiver from a first mobile station 101, which signal may include both noise and interference. The network node 600 comprises a processor 603 and a memory 604. The memory contains instructions executable by said processor, whereby the network node 600 is operative for obtaining a plurality of measured noise and interference power values, IN values, of signals received at a receiver in one or more frequency sub-bands, determining IN for a lowest X percentile of the measured IN values and applying the determined IN for the lowest X percentile as a measure of the noise. The memory further contains instructions executable by said processor, whereby the network node 600 is operative for obtaining a measured signal strength value for a signal received at the receiver from the first mobile station, and determining SNR for the signal by applying the determined noise measure. The network node 600 may be e.g. the base station with which the first UE communicates, or another network node of the communication network, such as the controller node 140 of FIG. 1.

According to an embodiment, the network node is operative for determining IN for the lowest X percentile by estimating a probability density function, PDF, from the measured plurality of IN values and extracting, from the PDF, the IN value of the lowest X percentile.

According to another embodiment, the network node is operative for determining IN for the lowest X percentile by: decreasing the IN estimate of the lowest X percentile by a first size, when a first IN value of the measured IN values is below an IN estimate of the lowest X percentile, and increasing the IN estimate of the lowest X percentile by a second size that is smaller than the first size, when a second IN value of the measured IN values is above the current IN estimate of the lowest X percentile, wherein the relation between the first and the second size is related to the value of X. The second size may be equal to $(X/(1-X))*$(first size).

The network node 600 may further comprise a communication unit 602, which may be considered to comprise conventional means for communicating from and/or to other nodes in the communication network, depending on in which network node in the communication network the functionality is installed. The communication unit may comprise one or more communication ports for communicating with other nodes in the network. The communciation unit may comprise one or more transceivers for communicating wirelessly with mobile stations. The network node may further comprise one or more storage units 606 and further functionality 607 useful for the network node to serve its purpose as network node. The instructions executable by said processor may be arranged as a computer program 605 stored in said memory 604. The processor 603 and the memory 604 may be arranged in an arrangement 601. The arrangement 601 may be a micro processor and adequate software and storage therefore, a Programmable Logic Device, PLD, or other electronic component(s)/processing circuit(s) configured to perform the actions, or methods mentioned above.

The computer program 605 may comprise computer readable code means, which when run in the network node 600 causes the network node to perform the steps described in any of the described embodiments. The computer program may be carried by a computer program product connectable to the processor. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the network node has access via its communication unit 602. The computer program may then be downloaded from the server into the memory 604.

Figure 9:
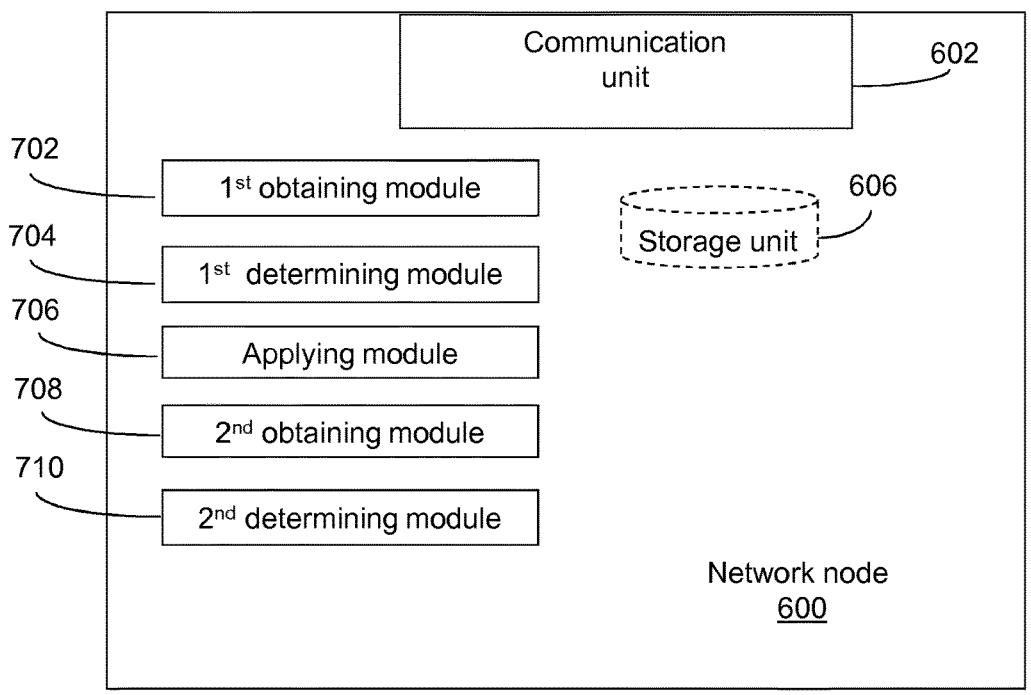

FIG. 9 describes another embodiment of a network node 600 operable in a wireless communication network 100, configured for determining signal to noise ratio of a signal received at a receiver from a first mobile station 101, which signal may include both noise and interference. The network node 600 comprises a first obtaining module 702 for obtaining a plurality of measured noise and interference power values, IN values, of signals received at a receiver in one or more frequency sub-bands, a first determining module 704 for determining IN for a lowest X percentile of the measured IN values and an applying module 706 for applying the determined IN for the lowest X percentile as a measure of the noise. The network node further comprises a second obtaining module 708 for obtaining a measured signal strength value for a signal received at the receiver from the first mobile station, and a second determining module 710 for determining SNR for the signal by applying the determined noise measure.

Figure 10:
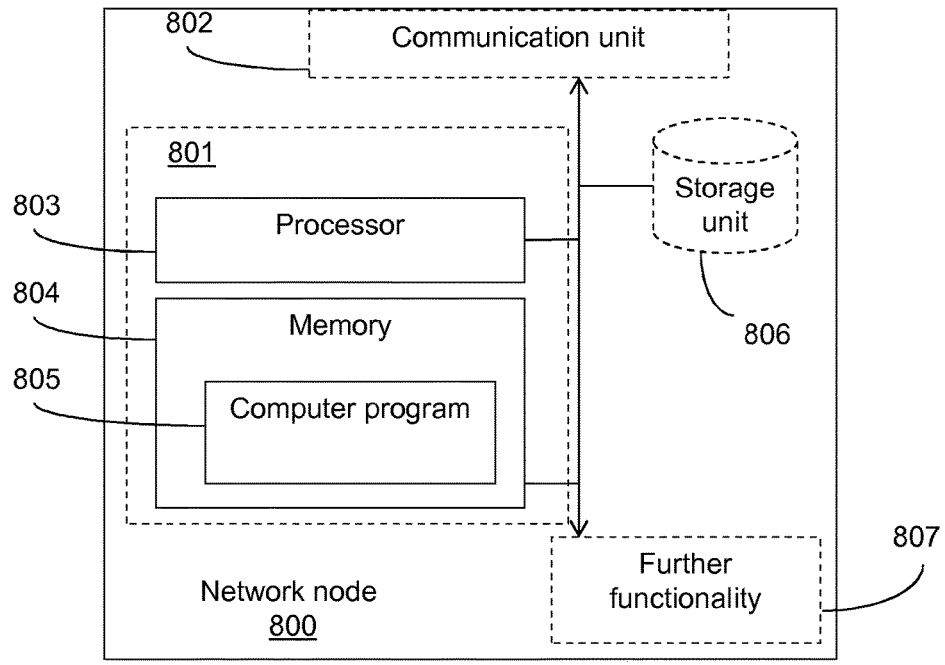

FIG. 10 describes an embodiment of a network node 800 operable in a packet data communication network, configured for controlling wireless transmission of delay-sensitive data from a first UE 101, which first UE is capable of changing between a TTI bundling enabled mode and a TTI bundling disabled mode. The network node 800 comprises a processor 803 and a memory 804, said memory containing instructions executable by said processor, whereby the network node 800 is operative for obtaining a plurality of measured noise and interference power values, IN values, of signals received at a receiver in one or more frequency sub-bands, determining IN for a lowest X percentile of the measured IN values and applying the determined IN for the lowest X percentile as a measure of the noise. The memory 804 further contains instructions executable by said processor, whereby the network node 800 is operative for obtaining a measured signal strength value for a signal received at the receiver from the first UE and determining SNR for the signal from the first UE by applying the determined noise measure. The memory 804 further contains instructions executable by said processor, whereby the network node 800 is operative for deciding that the first UE is to be in TTI bundling enabled mode when the determined SNR is below a first threshold value, and deciding that the first UE is to be in TTI bundling disabled mode when the determined SNR is above a second threshold value.

According to an embodiment, when the network node has decided that the first UE is to be in TTI bundling enabled mode and the network node has information that the first UE is in TTI bundling disabled mode, the network node is operative for sending an instruction to the first UE to switch to TTI bundling enabled mode, and when the network node has decided that the first UE is to be in TTI bundling disabled mode and the network node has information that first UE is in TTI bundling enabled mode, the network node is operative for sending an instruction to the first UE to switch to TTI bundling disabled mode.

According to an embodiment, the network node is operative for determining IN for the lowest X percentile by estimating a probability density function, PDF, from the measured plurality of IN values and extracting, from the PDF, the IN value of the lowest X percentile.

According to another embodiment, the network node is operative for determining IN for the lowest X percentile by decreasing the IN estimate of the lowest X percentile by a first size, when a first IN value of the measured IN values is below an IN estimate of the lowest X percentile, and increasing the IN estimate of the lowest X percentile by a second size that is smaller than the first size, when a second IN value of the measured IN values is above the current IN estimate of the lowest X percentile, wherein the relation between the first and the second size is related to the value of X.

According to another embodiment, the second size is equal to $(X/(1-X))*(\text{first size})$.

The network node 800 may further comprise a communication unit 802, which may be considered to comprise conventional means for communicating from and/or to other nodes in the communication network, depending on in which network node in the communication network the functionality is installed. The communication unit may comprise one or more communication ports for communicating with other nodes in the network. The communciation unit may comprise one or more transceivers for communicating wirelessly with mobile stations. The network node may further comprise one or more storage units 806 and further functionality 807 useful for the network node to serve its purpose as network node. The instructions executable by said processor may be arranged as a computer program 805 stored in said memory 804. The processor 803 and the memory 804 may be arranged in an arrangement 801. The arrangement 801 may be a micro processor and adequate software and storage therefore, a Programmable Logic Device, PLD, or other electronic component(s)/processing circuit(s) configured to perform the actions, or methods mentioned above.

The computer program 805 may comprise computer readable code means, which when run in the network node 800 causes the network node to perform the steps described in any of the described embodiments. The computer program may be carried by a computer program product connectable to the processor. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the network node has access via its communication unit 802. The computer program may then be downloaded from the server into the memory 804.

Figure 11:
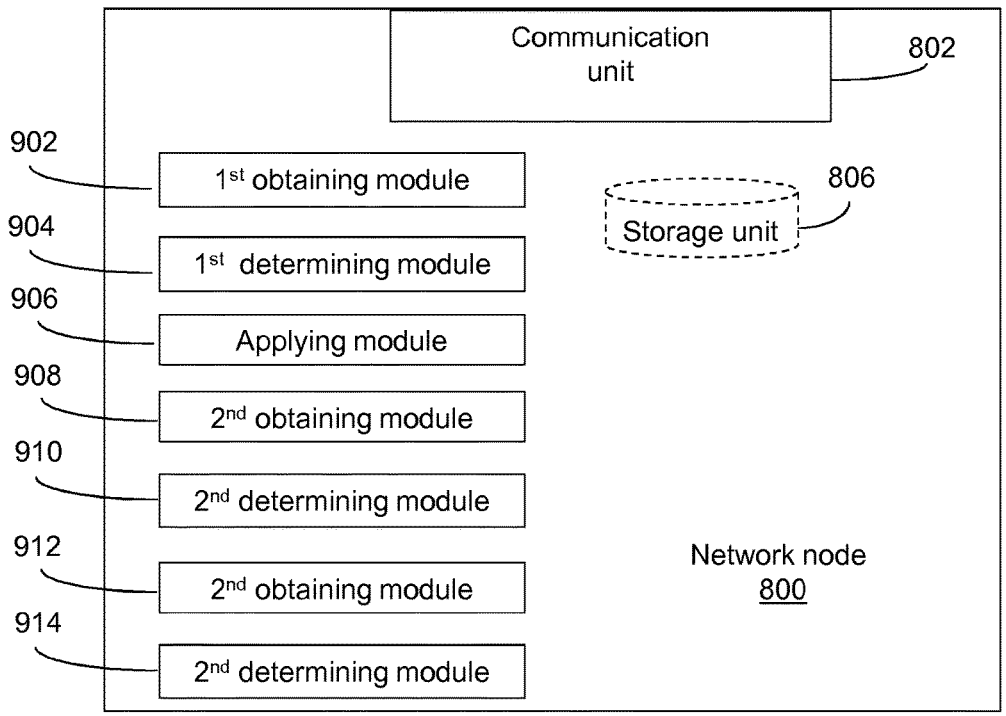

FIG. 11 describes another embodiment of a network node 800 operable in a packet data communication network, configured for controlling wireless transmission of delay-sensitive data from a first UE 101, which first UE is capable of changing between a TTI bundling enabled mode and a TTI bundling disabled mode. The network node 800 comprises a first obtaining module 902 for obtaining a plurality of measured noise and interference power values, IN values, of signals received at a receiver in one or more frequency sub-bands, a first determining module 904 for determining IN for a lowest X percentile of the measured IN values and an applying module 906 for applying the determined IN for the lowest X percentile as a measure of the noise. The network node 800 further comprises a second obtaining module 908 for obtaining a measured signal strength value for a signal received at the receiver from the first UE and a second determining module 910 for determining SNR for the signal from the first UE by applying the determined noise measure. The network node 800 further comprises a first deciding module 912 for deciding that the first UE is to be in TTI bundling enabled mode when the determined SNR is below a first threshold value, and a second deciding module 914 for deciding that the first UE is to be in TTI bundling disabled mode when the determined SNR is above a second threshold value.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a network node in a wireless communication network for determining signal to noise ratio of a signal received at a receiver from a first mobile station, which signal may include both noise and interference, the method comprising:
   obtaining a plurality of measured noise and interference power values, IN values, of signals received at the receiver in one or more frequency sub-bands,
   determining IN for a lowest X percentile of the measured IN values,
   applying the determined IN for the lowest X percentile as a measure of the noise;
   obtaining a measured signal strength value for a signal received at the receiver from the first mobile station,
   determining SNR for the signal from the first mobile station by applying the determined noise measure, and
   instructing the first mobile station to adapt a transmission time interval (TTI) bundling mode based on the determined SNR.

2. Method according to claim 1, wherein the IN for the lowest X percentile is determined by estimating a probability density function, PDF, from the measured plurality of IN values and extracting, from the PDF, the IN value of the lowest X percentile.

3. Method according to claim 1, wherein the IN for the lowest X percentile is determined by
   decreasing the IN estimate of the lowest X percentile by a first size, when a first IN value of the measured IN values is below an IN estimate of the lowest X percentile, and
   increasing the IN estimate of the lowest X percentile by a second size that is smaller than the first size, when a second IN value of the measured IN values is above the current IN estimate of the lowest X percentile, wherein the relation between the first and the second size is related to the value of X.

4. Method according to claim 3, wherein the second size is equal to $$(X/(1-X))*(\text{first size}).$$

5. A method performed by a network node of a packet data communication network, for controlling wireless transmission of delay-sensitive data from a first UE, which first UE is capable of changing between a TTI bundling enabled mode and a TTI bundling disabled mode, the method comprising:
   obtaining a plurality of measured noise and interference power values, IN values, of signals received at a receiver in one or more frequency sub-bands,
   determining IN for a lowest X percentile of the measured IN values,
   applying the determined IN for the lowest X percentile as a measure of the noise;
   obtaining a measured signal strength value for a signal received at the receiver from the first UE,
   determining SNR for the signal from the first UE by applying the determined noise measure,
   deciding that the first UE is to be in TTI bundling enabled mode when the determined SNR is below a first threshold value,
   deciding that the first UE is to be in TTI bundling disabled mode when the determined SNR is above a second threshold value, and
   transmitting, based on the steps of deciding, an instruction to switch to either the TTI bundling enabled mode or the TTI bundling disabled mode.

6. Method according to claim 5, wherein when it is decided that the first UE is to be in TTI bundling enabled mode and the network node has information that the first UE is in TTI bundling disabled mode, sending an instruction to the first UE to switch to TTI bundling enabled mode, and
   when it is decided that the first UE is to be in TTI bundling disabled mode and the network node has information that first UE is in TTI bundling enabled mode, sending an instruction to the first UE to switch to TTI bundling disabled mode.

7. Method according to claim 5, wherein the IN for the lowest X percentile is determined by estimating a probability density function, PDF, from the measured plurality of IN values and extracting, from the PDF, the IN value of the lowest X percentile.

8. Method according to claim 5, wherein the IN for the lowest X percentile is determined by:
   decreasing the IN estimate of the lowest X percentile by a first size, when a first IN value of the measured IN values is below an IN estimate of the lowest X percentile, and
   increasing the IN estimate of the lowest X percentile by a second size that is smaller than the first size, when a second IN value of the measured IN values is above the current IN estimate of the lowest X percentile, wherein the relation between the first and the second size is related to the value of X.

9. Method according to claim 8, wherein the second size is equal to $$(X/(1-X))*(\text{first size}).$$

10. A network node operable in a wireless communication network, configured for determining signal to noise ratio of a signal received at a receiver from a first mobile station, which signal may include both noise and interference, the network node comprising a processor and a memory, said memory containing instructions executable by said processor, whereby the network node is operative for:
- obtaining a plurality of measured noise and interference power values, IN values, of signals received at a receiver in one or more frequency sub-bands,
- determining IN for a lowest X percentile of the measured IN values,
- applying the determined IN for the lowest X percentile as a measure of the noise;
- obtaining a measured signal strength value for a signal received at the receiver from the first mobile station,
- determining SNR for the signal by applying the determined noise measure; and
- instructing the first mobile station to adapt a transmission time interval (TTI) bundling mode based on the determined SNR.

11. Network node according to claim 10, wherein the network node is operative for determining IN for the lowest X percentile by estimating a probability density function, PDF, from the measured plurality of IN values and extracting, from the PDF, the IN value of the lowest X percentile.

12. Network node according to claim 10, wherein the network node is operative for determining IN for the lowest X percentile by:
- decreasing the IN estimate of the lowest X percentile by a first size, when a first IN value of the measured IN values is below an IN estimate of the lowest X percentile, and
- increasing the IN estimate of the lowest X percentile by a second size that is smaller than the first size, when a second IN value of the measured IN values is above the current IN estimate of the lowest X percentile, wherein the relation between the first and the second size is related to the value of X.

13. Network node according to claim 12, wherein the second size is equal to $$(X/(1-X))*(\text{first size}).$$

14. A network node operable in a packet data communication network, configured for controlling wireless transmission of delay-sensitive data from a first UE, which first UE is capable of changing between a TTI bundling enabled mode and a TTI bundling disabled mode, the network node comprising a processor and a memory, said memory containing instructions executable by said processor, whereby the network node is operative for:
- obtaining a plurality of measured noise and interference power values, IN values, of signals received at a receiver in one or more frequency sub-bands,
- determining IN for a lowest X percentile of the measured IN values,
- applying the determined IN for the lowest X percentile as a measure of the noise;
- obtaining a measured signal strength value for a signal received at the receiver from the first UE,
- determining SNR for the signal from the first UE by applying the determined noise measure,
- deciding that the first UE is to be in TTI bundling enabled mode when the determined SNR is below a first threshold value,
- deciding that the first UE is to be in TTI bundling disabled mode when the determined SNR is above a second threshold value, and
- transmitting, based on the steps of deciding, an instruction to switch to either the TTI bundling enabled mode or the TTI bundling disabled mode.

15. Network node according to claim 14, wherein when the network node has decided that the first UE is to be in TTI bundling enabled mode and the network node has information that the first UE is in TTI bundling disabled mode, the network node is operative for sending an instruction to the first UE to switch to TTI bundling enabled mode, and
when the network node has decided that the first UE is to be in TTI bundling disabled mode and the network node has information that first UE is in TTI bundling enabled mode, the network node is operative for sending an instruction to the first UE to switch to TTI bundling disabled mode.

16. Network node according to claim 14, wherein the network node is operative for determining IN for the lowest X percentile by estimating a probability density function, PDF, from the measured plurality of IN values and extracting, from the PDF, the IN value of the lowest X percentile.

17. Network node according to claim 14, wherein the network node is operative for determining IN for the lowest X percentile by:
- decreasing the IN estimate of the lowest X percentile by a first size, when a first IN value of the measured IN values is below an IN estimate of the lowest X percentile, and
- increasing the IN estimate of the lowest X percentile by a second size that is smaller than the first size, when a second IN value of the measured IN values is above the current IN estimate of the lowest X percentile, wherein the relation between the first and the second size is related to the value of X.

18. Network node according to claim 17, wherein the second size is equal to $$(X/(1-X))*(\text{first size}).$$

19. A non-transitory computer-readable storage medium containing a computer-readable code that when read by a processor in a network node of a wireless communication network, the network node being configured for determining signal to noise ratio of a signal received at a receiver from a first mobile station, causes the processor to perform the following steps:
- obtaining a plurality of measured noise and interference power values, IN values, of signals received at a receiver in one or more frequency sub-bands,
- determining IN for a lowest X percentile of the measured IN values,
- applying the determined IN for the lowest X percentile as a measure of the noise;
- obtaining a measured signal strength value for a signal received at the receiver from the first mobile station,
- determining SNR for the signal by applying the determined noise measure, and
- instructing the first mobile station to adapt a transmission time interval (TTI) bundling mode based on the determined SNR.

20. A non-transitory computer-readable storage medium containing a computer-readable code that when read by a processor on a network node of a packet data communication network configured for controlling wireless transmission of delay-sensitive data from a first UE, which first UE is capable of changing between a TTI bundling enabled mode and a TTI bundling disabled mode, causes the processor to perform the following steps:
- obtaining a plurality of measured noise and interference power values, IN values, of signals received at a receiver in one or more frequency sub-bands, determining IN for a lowest X percentile of the measured IN values, applying the determined IN for the lowest X percentile as a measure of the noise;

obtaining a measured signal strength value for a signal received at the receiver from the first UE, determining SNR for the signal from the first UE by applying the determined noise measure, deciding that the first UE is to be in TTI bundling enabled mode when the determined SNR is below a first threshold value, deciding that the first UE is to be in TTI bundling disabled mode when the determined SNR is above a second threshold value, and transmitting, based on the steps of deciding, an instruction to switch to either the TTI bundling enabled mode or the TTI bundling disabled mode.

* * * * *